April 5, 1932.  C. W. MANSUR  1,852,815
METAL HUB AND THE LIKE
Filed Aug. 29, 1930

Inventor:
Clarence W. Mansur,
by Charles E. Tullar
His Attorney.

Patented Apr. 5, 1932

1,852,815

UNITED STATES PATENT OFFICE

CLARENCE W. MANSUR, OF MALDEN, MASSACHUSETTS, ASSIGNOR TO GENERAL ELECTRIC COMPANY, A CORPORATION OF NEW YORK

METAL HUB AND THE LIKE

Application filed August 29, 1930. Serial No. 478,731.

The present invention relates to metal hubs and the like.

The invention is adapted to be used generally, where the part carried by the hub is separate and distinct therefrom, and means are provided uniting the hub and the part carried thereby to prevent relative movement therebetween.

An application of the invention is in the adaptation of the metal hubs to molded non-metallic gear wheels, the hub being molded into the center of the gear wheel web.

In gears of this type it has been found that a strong, rigid bond must be formed between the hub and the body of the gear to prevent any movement of the hub relative to the gear and to insure rotation of the gear simultaneously with the hub. It is apparent, when a gear of this type is put into operation, that a resistance or retarding force is imparted to the body of the gear by the stationary parts actuated thereby, which retarding force is in a direction opposite to the direction of rotation of the hub by the driving shaft, and which tends, therefore, to destroy the rigid mounting of the gear on the hub and permits of a relative movement or slip between these members. Such movement, obviously, is undesirable, particularly where the gears act to operate parts which are in timed relation to each other causing an improper sequence of operation leading to inefficient and wasteful performance.

While I specifically illustrate and describe this invention as applied to a gear wheel, it is to be understood that it may be used wherever found applicable.

The object of my invention is to provide an improved construction and arrangement in a device of the above character, and for a consideration of what I believe to be novel and my invention, attention is directed to the following specification and the claims appended thereto.

In the drawings Fig. 1 is an elevation of a partially completed metal hub.

Figure 2:
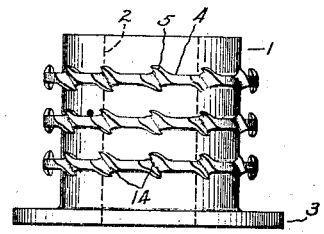
Fig. 2 is a view similar to Fig. 1 showing the completed hub.
Figure 3:
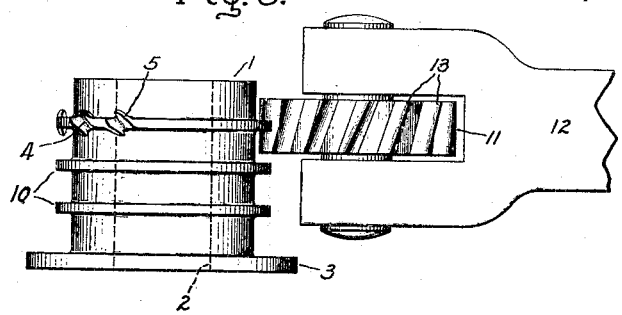
Fig. 3 is a view illustrating the manner in which a structure embodying my invention may be constructed.
Figure 4:
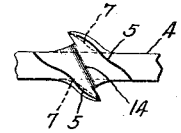
Fig. 4 is a view on an enlarged scale, showing the construction of one of the binding elements.
Figure 5:
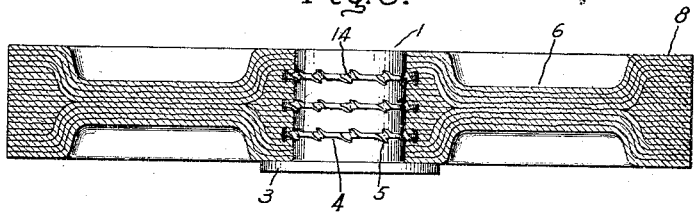
Fig. 5 is a sectional view, showing the hub as applied to a non-metallic gear wheel.

Referring to the drawings, the metallic hub 1 is shown as provided with a central bore 2 and a flange 3. The outer periphery of the hub is formed with one or a plurality of circumferential rows of teeth 4, formed integral with the hub, the end faces 5 of the teeth being bent at angles to the plane of the row and forming an overhang or pocket 7, some of the end faces being bent to one side of the plane of the row while others are bent to the other side thereof. The ends of each tooth are preferably bent in opposite directions while the corresponding ends of succeeding teeth are bent in the same direction, as shown in Figs. 2, 3 and 4. In Fig. 5 I have shown the hub as applied to a molded non-metallic gear wheel, whose web is indicated at 6 and the rim of which is shown at 8.

It will be apparent that, by this construction, I provide a hub, which, when molded as a part of a non-metallic gear wheel or the like, has a firm, rigid and non-yieldable connection therewith due to the fact that the molded material is pressed around the teeth and beneath the sloping angular end faces thereof into the pocket 7. Since the molded material is pressed around the angularly disposed end faces as well as into the pockets 7 there can be no relative movement or "play" between the hub and the body of the gear, either when the load or thrust is applied axially of the hub, or longitudinally thereof, or even when such load is applied at an angle to the axis of the hub, as is the case of gears having worm or spiral teeth formed on their peripheries.

It is very important, that there be no relative movement of any kind, in any direction between the body of the gear and the hub and such movement is eliminated by the peculiar construction of the teeth shown. Due to the upstanding teeth 4, there can be no movement of the body of the gear relative to the hub in a direction parallel to the axis of the hub and due to the angular extension of the end faces 5, turning of the body around the hub is prevented, while due to the overhang or pocket 7, as well as the angular extension of the side faces, movement of the body along the hub at an angle to the axis thereof, such as is occasioned when using a gear having spiral teeth, is prevented.

It has been found with the construction above described, that it is possible to utilize a hub that is lighter than those heretofore used, particularly when the hub carries a rotating body such as a gear wheel or pulley wheel, as the moment of inertia of the body is reduced.

Figure 1:
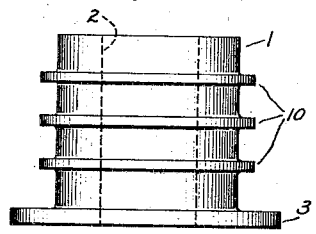

As one method of manufacture, I take a piece of metal of suitable size and shape having a bore 2 through its center and first form thereon the flange 3, and one or more projecting annular rings such as shown at 10 in Fig. 1. These rings may be formed in any suitable manner. The rings are then operated on with a tool of the type shown in Fig. 3. The tool consists of a roller 11 having its shaft suitably journaled in the member 12, the roller having formed on its periphery a series of angularly disposed V-shaped knives or punches 13. When the tool is pressed against a ring 10, as shown in Fig. 3, and the parts rotated relative to each other, the knives will be embedded in the ring which will be cut angularly as shown at 14 and the edges of the cut portions will be forced to one side at an angle to the plane of the ring, coinciding with the angular relation of the knives or punches 13 to the axis of the roller 11, the opposed ends of the teeth formed by the knives being forced in opposite directions.

In accordance with the provision of the patent statute I have described the principle of operation of my invention, together with the structure which I now consider to represent the best embodiment thereof, but I desire to have it understood that the construction shown is only illustrative and is not limited to the particuar form shown and described.

What I claim as new and desire to secure by Letters Patent of the United States is:

1. A metal hub or the like having a surface provided with one or more rows of upstanding, flat, elongated teeth, the opposite ends of which extend angularly in opposite directions relative to the side faces thereof, said ends curving downwardly and outwardly toward the surface of the hub to form pockets with the surface of the hub at the ends of the teeth.

2. A metal hub or the like having a surface provided with one or more rows of teeth, ends of the teeth extending angularly with respect to the side faces thereof and being disposed at an angle to the radial to form pockets with the surface of the hub.

3. A metal hub or the like having its surface provided with one or more annular rings, said rings being cut transversely at spaced points, the material at the cuts extending outwardly at an angle to the faces of the ring or rings.

4. A metal hub or the like having its surface provided with one or more annular rings, said rings at spaced points being cut transversely, the material at the cuts extending to one side of the ring or rings and angularly with respect to the surface of the hub to form pockets.

5. A unitary structure comprising a hub the surface of which is provided with one or more rows of teeth, ends of the teeth extending angularly with respect to the side faces thereof and being disposed at an angle to the radial to form pockets with the surface of the hub, and a substance molded to said hub with portions located in said pockets.

In witness whereof I have hereunto set my hand this twenty-seventh day of August, 1930.

CLARENCE W. MANSUR.